(No Model.)
J. A. BOURRY.
SAD IRON HEATER.
No. 418,970. Patented Jan. 7, 1890.
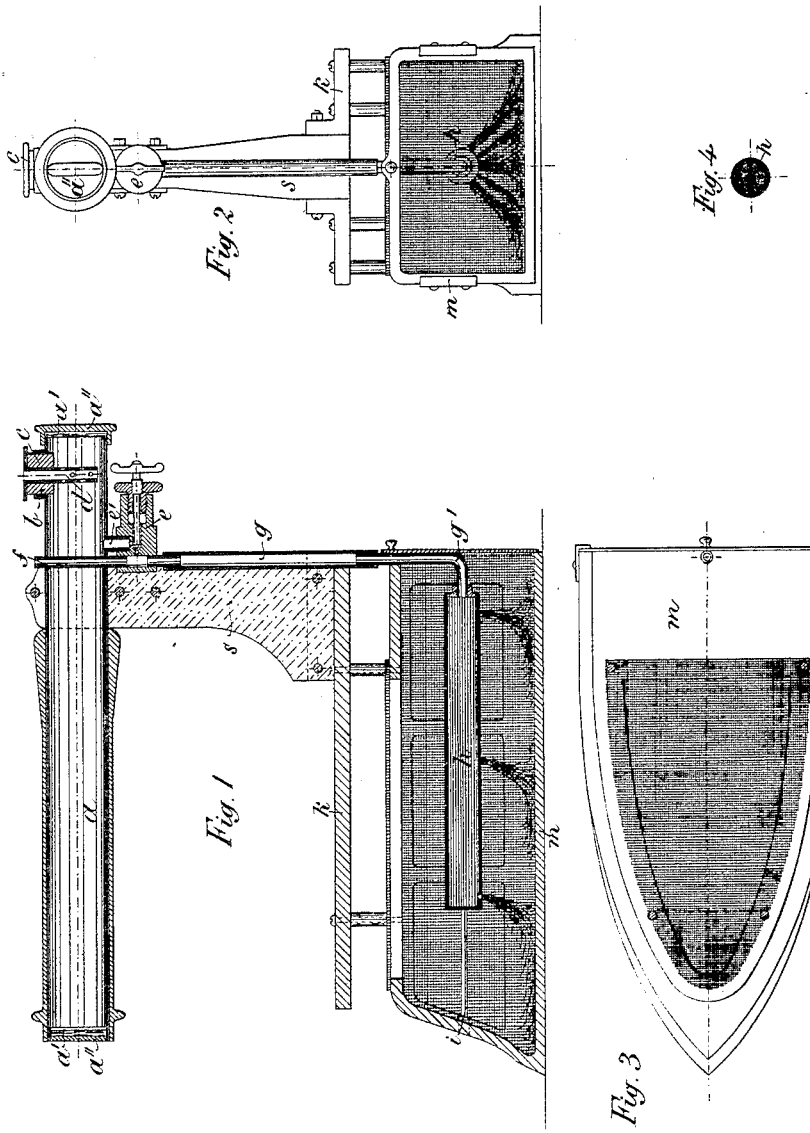
Witnesses.
Henry Gustave Rogers.
John J. Halsted
Inventor,
Julius Alfred Bourry,
By Paine & Ladd,
attys.

UNITED STATES PATENT OFFICE.

JULIUS ALFRED BOURRY, OF ZURICH, SWITZERLAND.

SAD-IRON HEATER.

SPECIFICATION forming part of Letters Patent No. 418,970, dated January 7, 1890.

Application filed May 10, 1888. Serial No. 273,479. (No model.)

*To all whom it may concern:*

Be it known that I, JULIUS ALFRED BOURRY, a citizen of Switzerland, residing at Zurich, in the canton of Zurich, Switzerland, have invented certain new and useful Improvements in Sad-Iron Heaters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention pertains to certain new and useful improvements in sad-iron heaters, having for its object the provision of new and improved highly-efficient means for readily and easily heating a sad-iron while the same is in use.

The invention comprises the details of construction, combination, and arrangement of parts, substantially as hereinafter fully set forth, and particularly pointed out in the claim.

In the accompanying drawings, Figure 1 is a vertical longitudinal sectional view showing my invention applied to a sad-iron. Fig. 2 is a rear end view thereof. Fig. 3 is a top plan view of the iron with the handle and screen removed. Fig. 4 is a detail sectional view of the burner.

The cylindrical reservoir $a$, serving as a handle, receives the liquid fuel, spirit, &c., and is filled at the short tube $b$, closed by the stopper $c$, which, in order to introduce air into the reservoir $a$ without spilling the fluid when ironing, is provided with a perforated little tube $d$. In order to make visible the level of the liquid, one or both extremities of the reservoir $a$ are closed with glass plates $a'$, which can be protected by covers $a''$, having a vertical slit. The regulating-valve $e$, placed under the reservoir $a$, is connected to it by a short tube $e'$. At its foremost top part it receives a small air-tube $f$, traversing the reservoir $a$ and forming the prolongation of the liquid-conducting tube $g$. The upper end of the tube $f$, which projects above reservoir $a$, is open, and its lower end is coincident with the upper end of tube $g$. This tube $f$ serves as a vent for tube $g$, permitting the fuel in said tube to reach the burner when the valve is closed.

The liquid is conducted from the valve $e$ through a tube $g$, having a lower branch $g'$, to the burner $h$, which, in order to obtain a high degree of heat, is filled by fine wire rods enveloped in a fine wire-gauze covering. (See Fig. 4.) This tube $g$ is preferably made of any dense metal—such as copper, brass, &c.—so that it will not be readily affected by the heat. Said tube is secured to or partly inclosed by the handle-stand S.

The burner $h$, which is placed in the center of the iron, is fastened on one side by the metallic tube $g'$ and on the other by a pin $i$. Its lower part is perforated with little holes or provided with little blast-pipes 3 to 7, from which the flames emerge as jets and flatten themselves on the bottom of the iron, as shown in Figs. 1 and 2.

The iron $m$ itself is composed of rods or ribs, the interposed spaces of which are covered all around and at the top of the iron with a fine wire-gauze to protect the cloth to be ironed against taking fire. The top of the iron is provided with a guard-plate or screen $k$, which, for the purpose of increasing the reflecting-power toward the bottom and to reduce the capacity of radiation of heat upward toward the handle, is polished on both sides.

After having filled the reservoir $a$ with spirit, &c., the working of the iron is as follows: The valve $e$ is opened until some drops of the liquid fall on the bottom of the iron. The valve is then shut and the dropped liquid ignited. The burner $h$, which is saturated with the liquid, is thus heated and in a short time the jet-flames are produced, when the feed of liquid is regulated by the valve $e$.

As the contents of the reservoir $a$ can constantly be observed through the glasses $a'$, the reservoir can be filled up again before the flames become extinguished for want of fuel, and the filling can be accomplished without extinguishing the flames in shutting the valve *e*.

I claim—

In a sad-iron heater, the reservoir having the outlet-pipe, the valve beneath the same, the burner, the tube leading thereto, and the vent-tube connected to said latter tube, substantially as set forth.

In testimony whereof I affix my signature in presence of two witnesses.

JULIUS ALFRED BOURRY.

Witnesses:
WILLM. HAIGHT,
F. KUPPERMER.